(12) United States Patent  (10) Patent No.: US 7,499,266 B2
Jeong et al.  (45) Date of Patent: Mar. 3, 2009

(54) SLIDING-TYPE PORTABLE TERMINAL

(75) Inventors: Wook-Dam Jeong, Bucheon-si (KR);
Yong-Jin Lee, Yongin-si (KR);
Byoung-Soo Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 11/850,523

(22) Filed: Sep. 5, 2007

(65) Prior Publication Data
US 2007/0298633 A1  Dec. 27, 2007

(30) Foreign Application Priority Data
Sep. 5, 2006  (KR) .................. 10-2006-0085357

(51) Int. Cl.
*G06F 1/16* (2006.01)
(52) U.S. Cl. ..................... 361/681; 439/596
(58) Field of Classification Search ........... 361/680, 361/681, 683; 439/596; 345/168, 169, 173
See application file for complete search history.

(56) References Cited

U.S. PATENT DOCUMENTS 5,898,774 A * 4/1999 Shindo ................. 379/433.13
7,092,246 B2 * 8/2006 Tanaka et al. ............... 361/681

FOREIGN PATENT DOCUMENTS

KR 1020040067278 7/2004
KR 1020060089794 8/2006

* cited by examiner

*Primary Examiner*—Khiem Nguyen
(74) *Attorney, Agent, or Firm*—The Farrell Law Firm, PC

(57) ABSTRACT

A sliding-type portable terminal, the sliding-type portable terminal having a first housing, and a second housing slidably coupled with the first housing. The sliding-type portable terminal includes a first driving device interposed between the first and second housings for providing driving force to make the second housing move to a position at which the first housing is open; a second driving device interposed between the first and second housing for providing driving force to make the second housing move to a position at which the second housing overlaps with the first housing, the second driving device having less driving force than that of the first driving device; a restricting device for restricting a sliding movement of the second housing at the position where the second housing overlaps with the first housing; and a releasing device for releasing the restriction of the second housing to the first housing.

10 Claims, 5 Drawing Sheets

SLIDING-TYPE PORTABLE TERMINAL

PRIORITY

This application claims priority to an application filed with the Korean Intellectual Property Office on Sep. 5, 2006 and assigned Serial No. 2006-85357, the contents of which are incorporated herein by reference.

BACKGROUND OF THE INVENTION

1. Field of the Invention

The present invention relates to a portable terminal, and more particularly to a sliding-type portable terminal having a pair of housings which can be slidably coupled with each other.

2. Description of the Related Art

In general, portable terminals refer to devices which serve users with a mobile communication function. Recently, portable terminals have not only been used as mobile communication devices, but have also played the role of multimedia devices to reproduce music files, moving picture files, etc., and financial service devices for micro payment, mobile banking, etc., to provide complex functions.

Such portable terminals may be classified into various types according to their appearance, such as a bar-type portable terminal, a flip-type portable terminal, a folder-type portable terminal, etc. Recently, sliding-type portable terminals have appeared, and have shared most of the portable terminal marketplaces along with folder-type portable terminals.

A bar-type portable terminal has a single body housing on which a data input/output unit, a transmitter, a display unit, and a receiver are mounted. A bar-type portable terminal has an advantage of having a simple configuration where all elements are embedded in a single body housing to provide mobile communication functions. However, there is limitation in miniaturization of a bar-type portable terminal because it is difficult to secure a distance between the transmitter and receiver in order to carry out voice communication.

A flip-type portable terminal has a structure where a flip is rotatably coupled with a bar-type portable terminal to close an input unit, such as a keypad, etc., in a communication-standby mode to prevent malfunction of the input unit. However, there is also a limitation in miniaturization of a flip type portable terminal because it is difficult to secure a distance between the transmitter and the receiver.

A folder-type portable terminal has a structure where a pair of housings can be rotatably coupled with each other and be folded. In folder-type portable terminals, an input unit and an output unit are arranged on two housings, respectively, thereby being useful for miniaturization of the folder-type portable terminals. Further, it is possible to secure a sufficient distance between the transmitter and the receiver. Consequently, folder-type portable terminals have had a significant market share of the portable terminal marketplaces for a long time.

A sliding-type portable terminal has a structure where a pair of housings can be slidably coupled with each other. In sliding-type portable terminals, an input unit and an output unit are arranged on housings, respectively. Especially, a keypad used as the input unit is opened and closed depending on sliding movement of the housings. Sliding-type portable terminals have advantages of preventing malfunction of the input unit, facilitating operation thereof, and miniaturization thereof. Accordingly, sliding-type portable terminals have made gradual inroads into the market for folder-type portable terminals, and now have a market share greater than folder-type portable terminals.

However, a conventional sliding-type portable terminal has a structure where one of housings should be manually opened and closed. Thus, there is inconvenience in which a user moves a housing of a sliding-type portable terminal in order to open and close sliding-type portable terminal. In addition, when a display unit is mounted on a sliding housing, there is a problem in that a user causes contamination of the display unit when the user touches a window of the display unit. Further, in order to solve this problem and to improve convenience of a user, a sliding-type portable terminal, in which housings are semi-automatically opened and closed, has been developed to overcome the disadvantage of the above-mentioned sliding-type portable terminal which is opened and closed manually. However, since a sliding-type portable terminal having a semi-automatic opening and closing mechanism also has a disadvantage in that a user has to directly move one of the housings beyond a predetermined distance, it is inconvenient for the user to use this type of sliding-type portable terminal.

SUMMARY OF THE INVENTION

Accordingly, the present invention has been made to solve the above-mentioned problems occurring in the prior art, and it is an aspect of the present invention to provide a sliding-type portable terminal which can be easily opened.

It is another aspect of the present invention to provide a sliding-type portable terminal which can be easily opened and closed.

In order to accomplish these aspects of the present invention, there is provided a sliding-type portable terminal having a first housing and a second housing coupled with the first housing to slide from a position at which the second housing overlaps with the first housing to a position at which the first housing is open, the portable terminal including a first driving portion interposed between the first and second housings for providing driving force to make the second housing move to the position at which the first housing is open; a second driving portion interposed between the first and second housing for providing driving force to make the second housing move to the position at which the second housing overlaps with the first housing, the second driving portion having less driving force than that of the first driving portion; a restriction device for restricting a sliding movement of the second housing at the position where the second housing overlaps with the first housing; and a releasing device for releasing the restriction of the second housing to the first housing.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. In the following description of the present invention, a detailed description of known functions and configurations incorporated herein is omitted to avoid making the subject matter of the present invention unclear.

Figure 1:
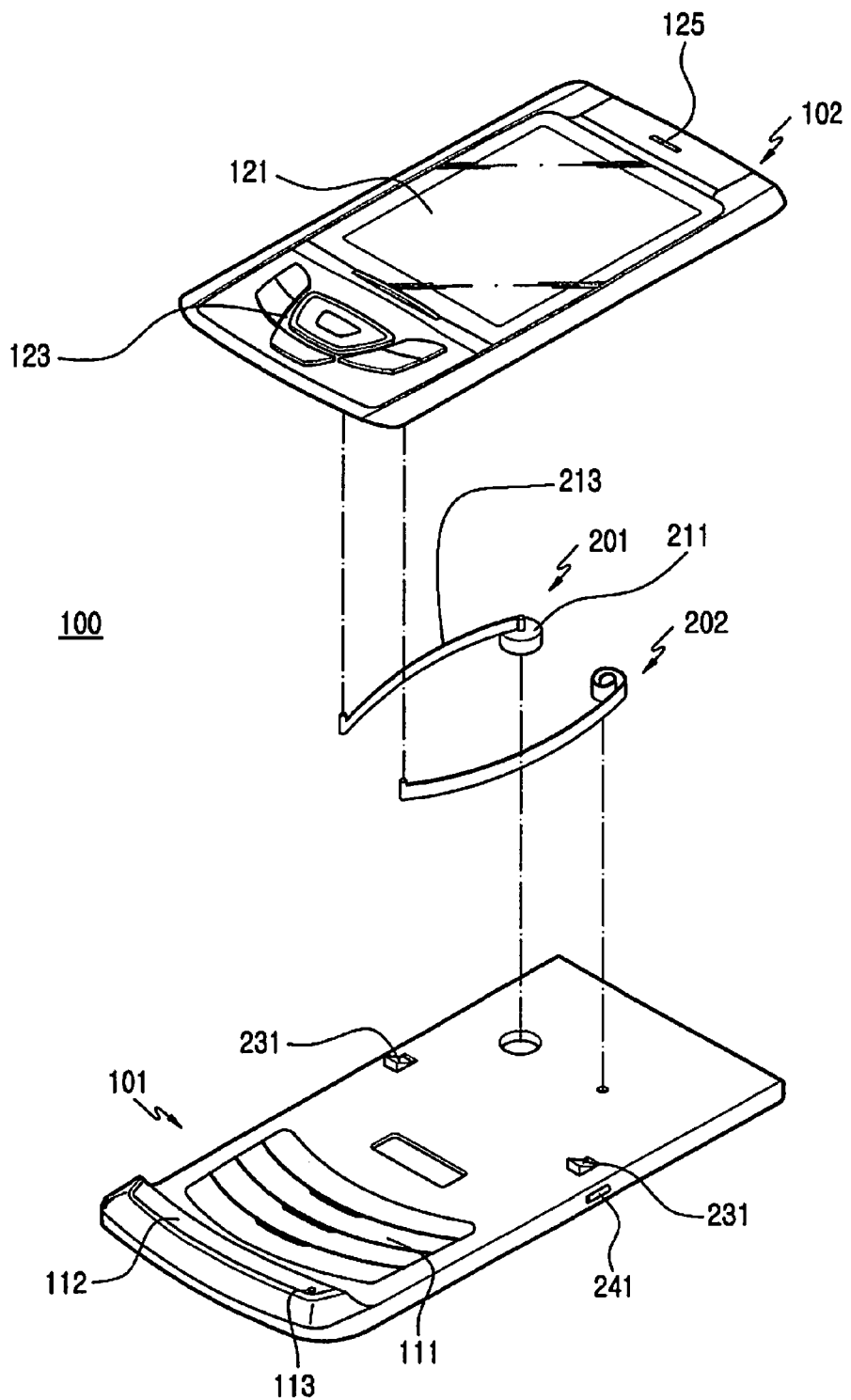
FIG. 1 is an exploded perspective view showing a sliding-type portable terminal according to the present invention.
Figure 2:
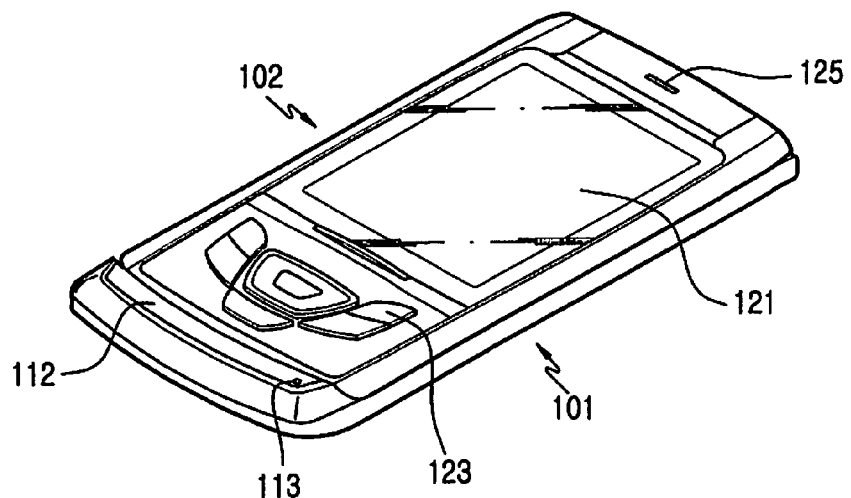
FIG. 2 is a perspective view showing the sliding-type portable terminal shown in FIG. 1, in which the portable terminal is open.
Figure 3:
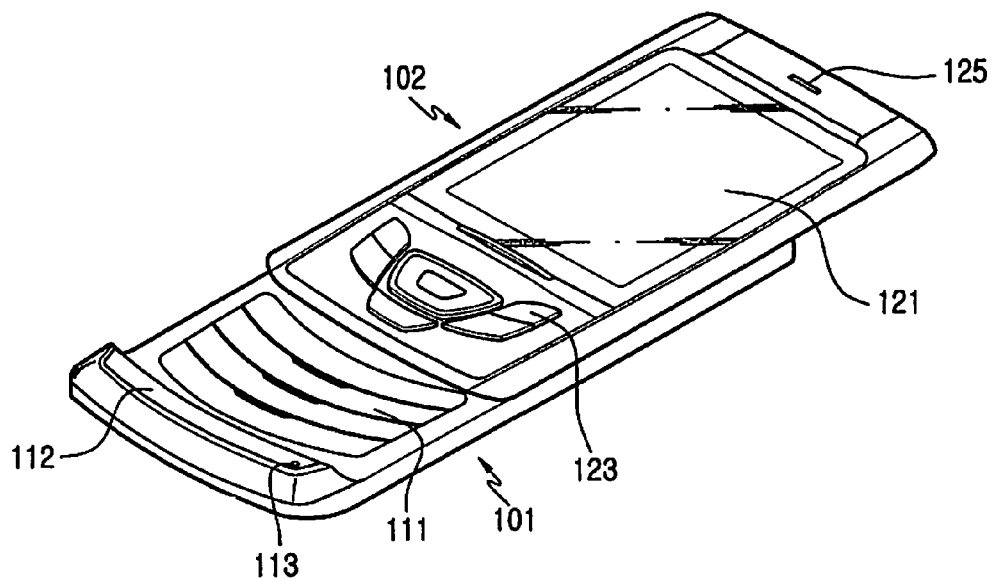
FIG. 3 is a perspective view showing the sliding-type portable terminal shown in FIG. 1, in which the portable terminal is closed.

As shown in FIGS. 1 to 3, a sliding type portable terminal 100 according to the present invention includes a first housing 101, and a second housing 102 coupled to the first housing 101 while facing the first housing 101. In the sliding type portable terminal 100, the second housing 102 can slide from a position at which the second housing 102 overlaps with the first housing 101, to a position at which the first housing 101 is partially open.

The second housing 102 is subjected to driving force of the first and second driving portions 201 and 202, respectively, to slide on the first housing 101, is restricted by restricting device to overlap with the first housing 101, and is released by the driving portions 201 and 202 from a restricted state where the second housing 102 overlaps with the first housing 101, to slide in a direction of opening a part of the first housing 101.

The first housing 101 has a keypad 111 arranged on a surface thereof, which includes keys used for inputting numbers and characters, and is open and closed when the second housing 102 slides. The first housing 101 has a protrusion 112 formed at the lower end thereof, which is located adjacent to the keypad 111 and on which a microphone 113 is mounted to convert a user's voice into electric signals.

The second housing 102 has a display unit 121 mounted on a surface of the second housing 102, and a functional keypad 123 and a speaker unit 125 disposed adjacent to the display unit 121. The functional keypad 123 may operate using a calling/selecting/executing menu, and may search for stored information.

The sliding type portable terminal 100 operates in different modes as the second housing 102 slides on the first housing 101.

For example, as shown in FIG. 2, the portable terminal 100 may be set in a broadcasting watching mode, a game mode, a file replaying mode, etc., at a position where the second housing 102 overlaps with the first housing 101. As shown in FIG. 3, when the keypad 111 of the first housing 101 is open and exposed, the portable terminal 100 may be set in a voice communication mode, a character input mode, a chatting mode, etc.

Specifically, in the broadcasting watching mode, the file reproduction mode and the game mode, which do not use operation of plural keys, it is possible to call a menu of the terminal 100 and to execute the terminal 100 with only the functional keypad 123 when the first housing 101 is closed. On the other hand, in the mailing mode and the communication mode, etc., which use operation of the keys in order to input characters and phone numbers, the keypad 111 is open and used. Further, in the voice communication mode, in order to position the microphone 113 and the speaker 125 near mouth and ear of the user, respectively, the second housing 102 is preferably moved to an upper portion of the first housing 101.

The first and second driving portions 201 and 202 respectively provide driving force to enable the second housing 102 to slide. The first driving portion 201 provides driving force to make the second housing 102 move in a direction where the first housing 101 is partially open. The second driving portion 202 provides driving force to cause the second housing 102 to move in a direction where the first housing 101 is closed.

The first driving portion 201 provides driving force greater than that of the second driving portion 202, so the second housing always is subjected to a driving force applied in a direction of opening a part of the first housing 101.

The first driving portion 201 includes a winder 211 and a link member 213. The link member 213 has one end fixed to the second housing 102 and another end fixed to the winder 211. The winder 211 is mounted on the first housing 101. The link member 213 is spirally wound around a certain point on the winder 211 by rotation force of the winder 211. As a result, the first driving portion 201 generates driving force applied in a direction where both ends of the link member 213 approach each other.

The second driving portion 202 has one end fixed to the first housing 101 and another end fixed to the second housing 102. The second driving portion 202 provides driving force applied in a direction where both ends thereof withdraw from each other. The second driving portion 202 includes a spiral spring. As the second housing 102 slides, the second driving portion 202 may be spirally wound around a protrusion fixed to the first housing 101.

Figure 4:
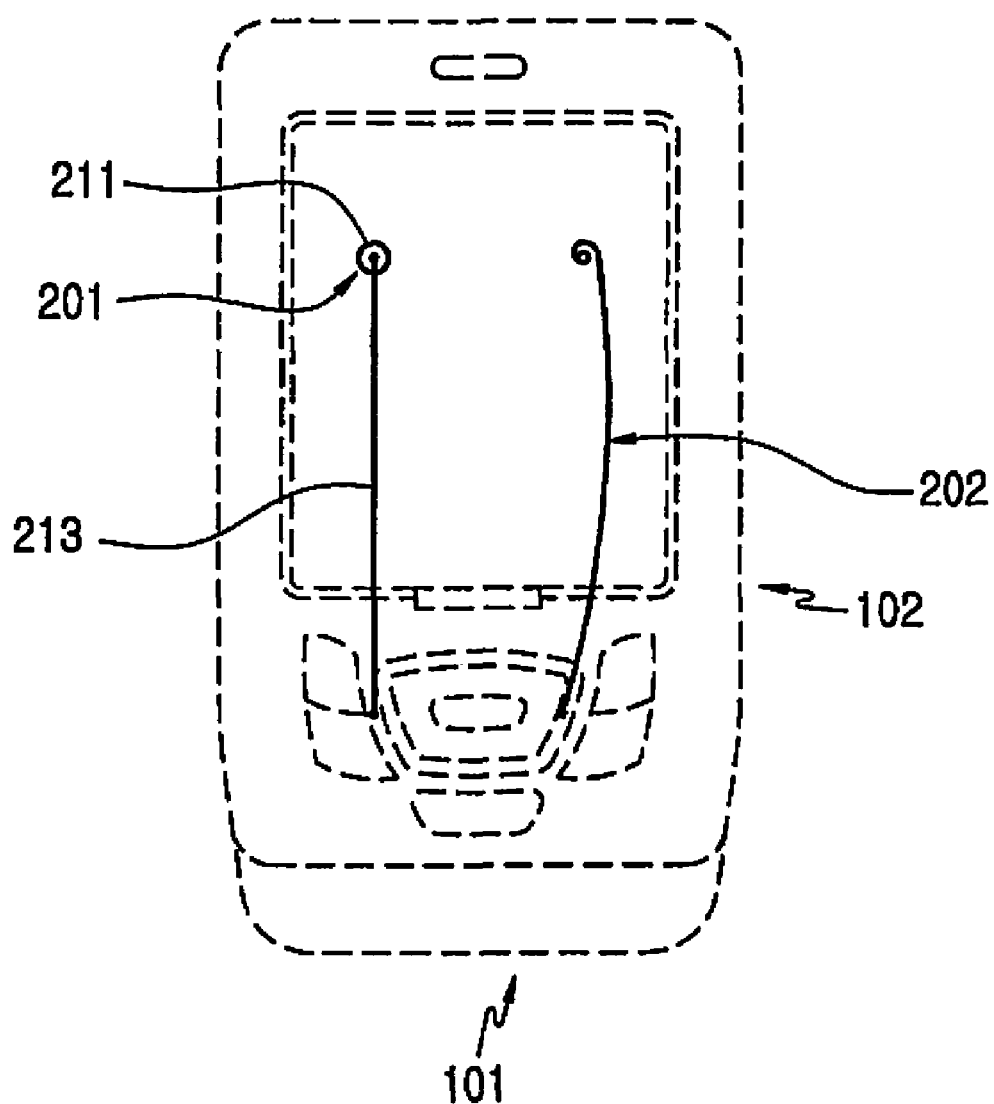
FIG. 4 is a view illustrating a driving portion of the sliding-type portable terminal shown in FIG. 2.
Figure 5:
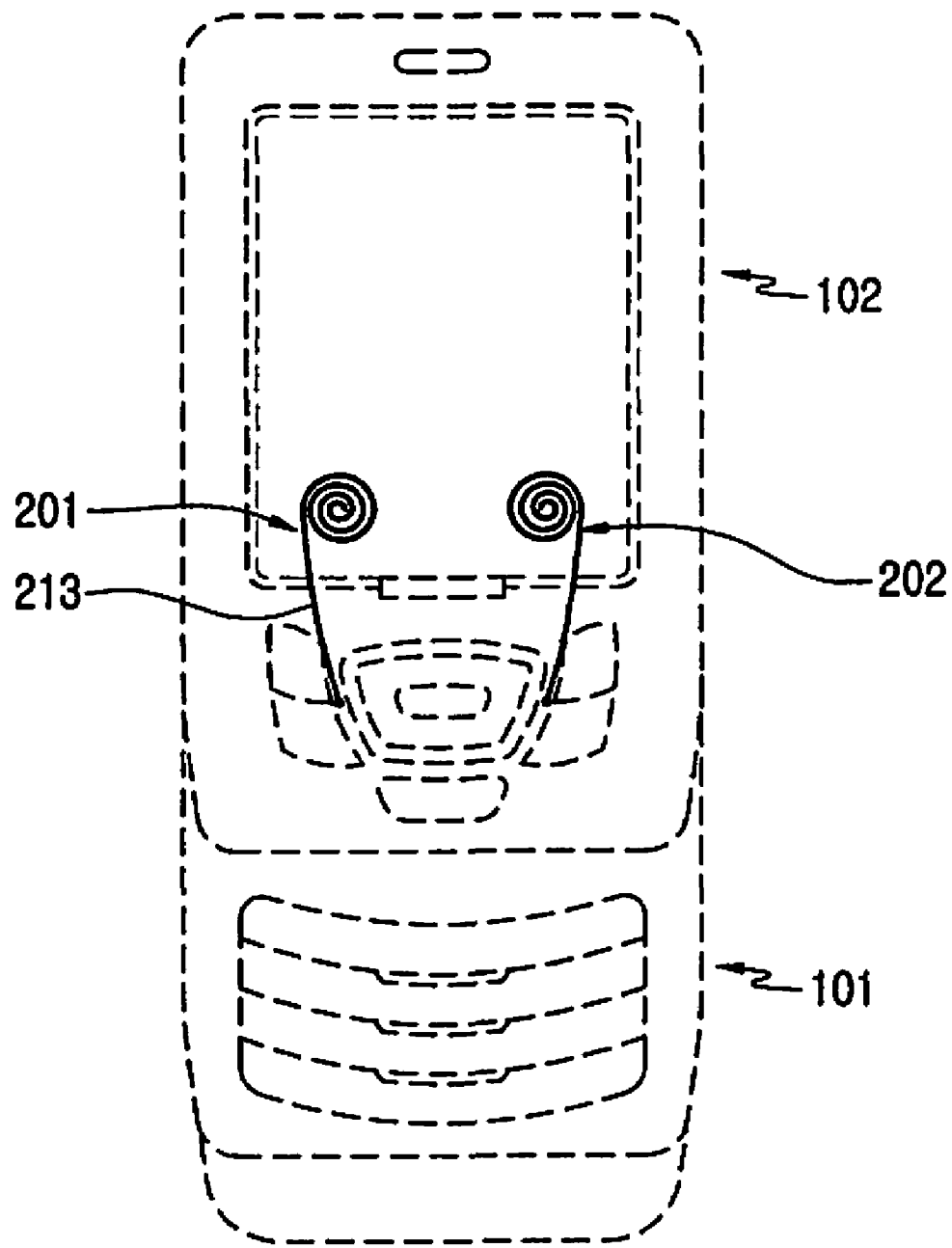
FIG. 5 is a view illustrating a driving portion of the sliding-type portable terminal shown in FIG. 3.

Referring to FIGS. 4 and 5, both ends of the first and second driving portions 201 and 202 are farthest away from each other when the second housing 102 overlaps with the first housing 101. Since the first driving portion 201 provides driving force applied in a direction where both ends approach each other, maximum driving force is accumulated in the first driving portion 201 when both ends of the first driving portion 201 are farthest away from each other, as shown in FIG. 4. On the other hand, since the second driving portion 202 provides driving force applied in a direction where both ends withdraw from each other, minimum driving force is accumulated in the second driving portion 202 when both ends of the second driving portion 202 are farthest away from each other, as shown in FIG. 4.

When the second housing 102 overlaps with the first housing 101, the second housing 102 is slid by driving force of the first driving portion 201 toward an upper portion of the first housing 101.

As shown in FIG. 5, when the second housing 102 moves to the upper portion of the first housing 101, a part of the housing 101, i.e. the keypad 111, is open. Both ends of the first driving portion 201 and both ends of the second driving portion 202, respectively, approach each other. As a result, driving force accumulated in the first driving portion 201 becomes minimum, while driving force accumulated in the second driving portion 202 becomes maximum. However, since driving force provided by the first driving portion 201 is greater than that of the second driving portion 202, the keypad 111 of the first housing 101 can be maintained in an open position.

When the keypad 111 of the first housing 101 is open, the link member 213 of the first driving portion 201 is spirally wound around the protrusion on the winder 211. The second driving portion 202 also is spirally wound around the protrusion on the first housing 101. The first driving portion 201 accumulates minimum driving force, and the second driving portion 202 accumulates maximum driving force.

When a user moves the second housing 102 in a direction where the second housing overlaps with the first housing 101, the second driving portion 202 also applies driving force to the second housing 102 to move the second housing 102. Therefore, since the user can move the second housing 102 with little force, it is possible to easily close the first housing 101.

Meanwhile, driving force of the first and second driving portions 201 and 202 is applied to the second housing 102 in a direction where the first housing is open. The restriction device maintains the overlapping state of the second housing 102 with the first housing 101 even though driving force of the driving portions 201 and 202 is applied to the second housing 102.

Figure 6:
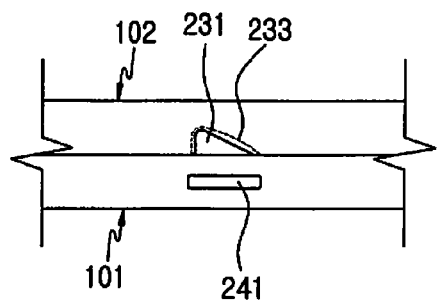
FIG. 6 is a view illustrating a driving portion of the sliding-type portable terminal shown in FIG. 1.

Referring to FIG. 6, the restriction device includes the fixing protrusions 231 installed on the first housing 101, which appear and disappear, and fixing grooves 233 formed in the second housing 102. The fixing protrusions 231 are mounted on a surface of the first housing 101 to appear and disappear on the first housing 101, but are covered with the second housing 102 and are not externally exposed. The fixing grooves 233 are formed at positions facing the fixing protrusions 231 when the second housing 102 overlaps with the first housing 101. Hence, when the second housing 102 overlaps with the first housing 101, the fixing protrusion 231 protrudes out of a surface of the first housing 101, and is engaged with the fixing groove 233. Although driving force of the first driving portion 201 is applied to the second housing 102, restriction of the second housing 102 by the first housing 101 is maintained.

Although a structure of the first and second housings 101 and 102 is shown where the fixing protrusion 231 and the fixing groove 233 are installed and formed at positions near both ends of the first and second housings 101 and 102, only one fixing protrusion 231 may alternatively be installed on the first housing 101.

The releasing device 204 is installed near the restriction device on the first housing 101 in order to release the second housing 102 restricted in the first housing 101 by the restriction device.

Figure 7:
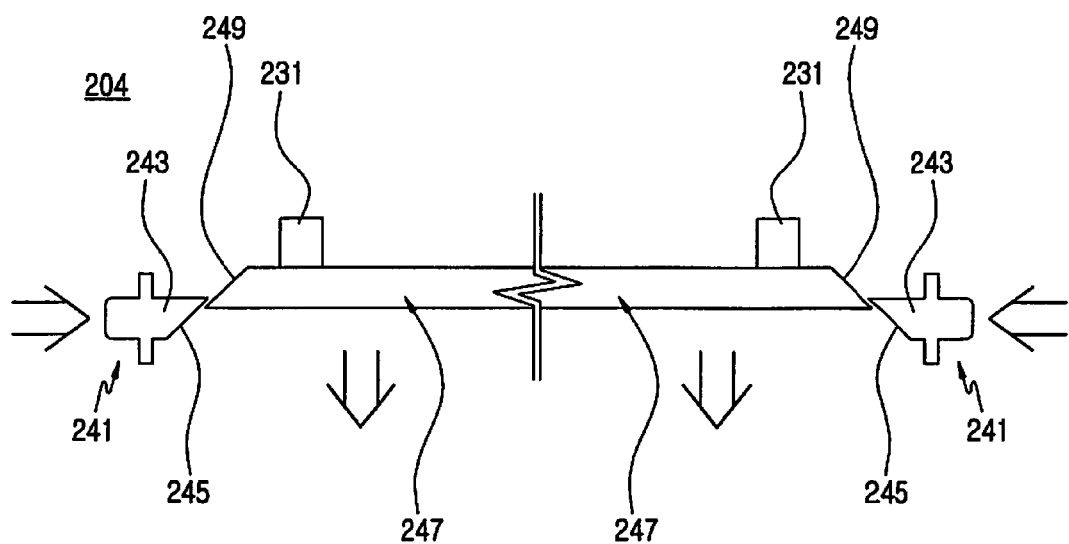
FIG. 7 is a view illustrating unlocking portion of the sliding-type portable terminal shown in FIG. 1.

Referring to FIG. 7, the releasing device 204 includes a driven frame 247, a driving frame 243, and driving buttons 241. The driven frame 247 is installed on the first housing 101 to ascend and descend, on a surface of which the fixing protrusion 231 is installed.

The driving buttons 241 are installed on both sides of the first housing 101 to be capable of appearing and disappearing, and have the driving frames 243 formed on the inner surface thereof, respectively. Specifically, the driving buttons 241 are reciprocally installed on the first housing 101, and the driving frames 243 also reciprocate along with the driving buttons 241 in the first housing 101. In addition, as each of the driving frames 243 straightly reciprocates in the first housing 101, a part thereof interferes with the driven frame 247.

The driven frame 247 has a first inclined surface 249, and the driving frame 243 has a second inclined surface 245. When the driving frames 243 straightly reciprocate, the second inclined surface 245 makes sliding contact with the first inclined surface 249 to enable the driven frame 247 to ascend and descend. Specifically, when the driving frames 243 approaches the driven frame 247, the second inclined surface 245 makes sliding contact with the first inclined surface 249 to the driven frame 247 to descend.

The driven frame 247 and the driving frames 243 may be installed near the ends of the first housing 101. When the driven frame 247 has enough length to reach both ends of the first housing 101, only one driven frame 247 may be installed on the first housing 101. When only one driven frame 247 is installed on the first housing 101 while two restriction devices are installed on both ends of the first housing 101, the driven frame 247 has a pair of fixing protrusions 231 installed thereon. The number of fixing protrusions 231 of the portable terminal may be selected as desired.

Although not shown, it will be understood by those skilled in the art that elastic member may be provided for the portable terminal to enable the fixing protrusion to protrude out of the first housing 101. In other words, elastic member may be provided in the first housing 101 to apply elasticity to the driven frame 247 to keep the driven frame 247 at an ascended position. When the driving buttons 241 are pressed, the second inclined surfaces 245 may then make sliding contact with the first inclined surfaces 249, so the driven frame 247 descends and the fixing protrusions 231 recess into the first housing 101.

When the second housing 102 overlaps with the first housing 101, the fixing protrusions 231 are received in the fixing grooves 233, respectively, as shown in FIG. 6. Therefore, the second housing 102 is kept overlapping with the first housing 101 even though the first driving portion 201 applies driving force to the second housing 102.

When the user presses the driving buttons 241, the driving buttons 241 recess into the first housing 101 so the driving frames 243 move in a straight manner to press the driven frame 247.

The straight movement of the driving frame 243 causes the second inclined surface 245 to push down the first inclined surface, and thereby the driven frame 247 descends, resulting in infiltration of the fixing protrusions 231 into the first housing 101.

When the fixing protrusions 231 are recessed into the first housing 101 and completely removed from the fixing grooves 233, the second housing 102 is released from its restricted state. Then, the second housing 102 is moved by driving force of the first driving portion 201 in a direction where the first housing 101 is open.

As described above, when the user moves the second housing 102 again in a direction where the second housing 102 overlaps with the first housing 101, driving force of the second driving portion 202 enables the second housing 102 to move easily.

Meanwhile, guiding members, such as a guide rail, make the second housing 102 slidably couple with the first housing 101. However, it is noted that a detailed description of the guiding members have not been provided.

As described above, a sliding type portable terminal according to the present invention has an advantage of sliding the second housing easily using a first driving portion, a restriction device, and a release device. Further, a sliding type portable terminal according to the present invention has another advantage in that when an open terminal is closed again, driving force of a second driving portion is applied to a second housing in addition to driving force of a first driving portion, thereby making it possible to easily close the portable terminal. Furthermore, since a sliding type portable terminal according to the present invention can be operated automatically or manually, it is possible to diversify designs and opening/closing operations of the portable terminal. In addition, since it is unnecessary to directly operate a housing on which a display unit is mounted, it is possible to prevent contamination of a display window caused by fingerprints.

In the present invention, the winder 211 and the link member 213 are used as the first driving portion 201. However, it is obvious that any element can be used as the first driving portion when it provides driving force in a direction where both ends thereof approach each other as a tension coil spring does. Further, in the present invention, use of a spiral spring as the second driving portion 202 is described. However, it is obvious that an element, such as a compressed coil spring or a zigzag spring, which can provide driving force in a direction where both ends thereof withdraw from each other, can be used as the second driving portion 202.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding-type portable terminal comprising:
    a first housing and a second housing coupled with each other, so the second housing can slide from a position at which the second housing overlaps with the first housing to a position at which the first housing is open;
    a first driving portion interposed between the first and second housings for providing driving force to make the second housing move to the position at which the first housing is open;
    a second driving portion interposed between the first and second housing for providing driving force to make the second housing move to the position at which the second housing overlaps with the first housing, the second driving portion having less driving force than that of the first driving portion;
    a restriction device for restricting a sliding movement of the second housing at the position where the second housing overlaps with the first housing; and
    a releasing device for releasing the restriction of the second housing to the first housing.

2. The sliding-type portable terminal as claimed in claim 1, wherein the first driving portion includes a winder mounted on the first housing, and a link member having one end fixed to the winder and another end fixed to the second housing, the link member being spirally wound on an end of the winder to provide driving force to enable both ends of the link member to approach each other.

3. The sliding-type portable terminal as claimed in claim 2, wherein both ends of the link member are spaced farthest from each other when the second housing is folded over the first housing, while approaching each other when the first housing is partially open.

4. The sliding-type portable terminal as claimed in claim 1, wherein the second driving portion includes a spiral spring having one end fixed to the first housing and another end fixed to the second housing, and is wound on one end thereof fixed to the second housing to accumulate driving force in a direction where both ends of the second driving portion withdraw from each other when the second housing allows the first housing to be partially open.

5. The sliding-type portable terminal as claimed in claim 4, wherein both ends of the second driving portion are spaced farthest away from each other when the second housing overlaps with the first housing, while being located nearest from each other when the second housing allows the first housing to be partially open.

6. The sliding-type portable terminal as claimed in claim 1, wherein the restriction device includes at least one stationary protrusion fixed to the first housing to be capable of appearing and disappearing and at least one fixing groove defined in the second housing, the at least one stationary protrusion being engaged with the at least one fixing groove to restrict the second housing within a state of overlapping with the first housing when the second housing overlaps with the first housing.

7. The sliding-type portable terminal as claimed in claim 6, wherein the releasing device includes a driven frame having the at least one stationary protrusion fixed to a surface thereof and mounted on the first housing to ascend and descend, a driving button mounted on a side of the first housing to appear and disappear, and a driving frame disposed on an inner surface of the driving button and moving in a straight manner along with the driving button, the driving frame moving in a straight manner to interfere with the driven frame so the driven frame ascends and descends.

8. The sliding-type portable terminal as claimed in claim 7, wherein the releasing device further comprises a first inclined surface formed on the driving frame, and a second inclined surface making sliding contact with the first inclined surface, the first inclined surface making sliding contact with the second inclined surface to move the driven frame so the at least one stationary protrusion recesses into the first housing.

9. The sliding-portable terminal as claimed in claim 7, wherein the at least one stationary protrusion is a pair of stationary protrusions mounted on the driven frame in parallel.

10. The sliding-portable terminal as claimed in claim 7, wherein the driven frame and the driving button are installed on both ends of the first housing, respectively.

* * * * *